US010367619B2

(12) United States Patent
Wang et al.

(10) Patent No.: US 10,367,619 B2
(45) Date of Patent: Jul. 30, 2019

(54) TRANSMITTER DEVICE, RECEIVER DEVICE AND METHODS THEREOF

(71) Applicant: Huawei Technologies Co., Ltd., Shenzhen (CN)

(72) Inventors: Fan Wang, Shanghai (CN); Fredrik Berggren, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/806,159

(22) Filed: Nov. 7, 2017

(65) Prior Publication Data

US 2018/0076938 A1 Mar. 15, 2018

Related U.S. Application Data

(63) Continuation of application No. PCT/EP2015/060242, filed on May 8, 2015.

(51) Int. Cl.
*H04L 5/00* (2006.01)
*H04W 72/04* (2009.01)
*H04W 72/12* (2009.01)

(52) U.S. Cl.
CPC .......... *H04L 5/0048* (2013.01); *H04L 5/0044* (2013.01); *H04L 5/0078* (2013.01); *H04W 72/0446* (2013.01); *H04W 72/1273* (2013.01); *H04L 5/0007* (2013.01); *H04L 5/0053* (2013.01)

(58) Field of Classification Search
CPC ... H04L 5/0048; H04L 5/0044; H04L 5/0078; H04L 5/0007; H04L 5/0053; H04W 72/1273; H04W 72/0446
See application file for complete search history.

(56) References Cited

U.S. PATENT DOCUMENTS

2015/0016428 A1* 1/2015 Narasimha ............ H04L 5/0058 370/336
2015/0023331 A1* 1/2015 You ....................... H04L 5/0048 370/336

FOREIGN PATENT DOCUMENTS

WO 2015018075 A1 2/2015

OTHER PUBLICATIONS

Huawei, "Periodic CQI/PMI/RI Reporting Using PUCCH for CA", 3GPP TSG RAN WG1 meeting #62, R1-104500, Madrid, Spain, Aug. 23-27, 2010, 5 pages.

(Continued)

*Primary Examiner* — Dady Chery
(74) *Attorney, Agent, or Firm* — Slater Matsil, LLP

(57) ABSTRACT

Embodiments relate to a transmitter device and a receiver device. The transmitter device comprises a processer configured to: map at least one first signal to a first subframe, map at least one second signal to a second subframe having a variable time offset in relation to the first subframe; and a transceiver configured to transmit the first signal in the first subframe, transmit the second signal in the second subframe. The receiver device comprises a receiving device configured to receive a first signal transmitted in a first subframe, and receive a second signal transmitted in a second subframe having a variable time offset in relation to the first subframe; and a processor configured to process the received first signal, and process the received second signal. Furthermore, the embodiments also relate to corresponding methods, a computer program, and a computer program product.

20 Claims, 6 Drawing Sheets

(56) References Cited

OTHER PUBLICATIONS

3GPP, 3rd Generation Partnership Project;Technical Specification Group Radio Access Network; Physical channels and mapping of transport channels onto physical channels (FDD) (Release 12), 3GPP TS 25.211 V12.1.0 (Dec. 2014), 67 pages.
Fujitsu, "DL Data and CRS Transmission for LAA," 3GPP TSG RAN WG1 Meeting #79, R1-144785, San Francisco, CA USA, Nov. 17-21, 2014, 8 pages.
3GPP, 3rd Generation Partnership Project;Technical Specification Group Radio Access Network; Evolved Universal Terrestrial Radio Access (E-UTRA); Physical channels and modulation (Release 12), 3GPP TS 36.211 V12.4.0 (Dec. 2014), 124 pages.
Samsung, "Discussion on LAA DRS Design," 3GPP TSG RAN WG1 Meeting #80bis, R1-151619, Belgrade, Serbia, Apr. 20-24, 2015, 5 pages.
3GPP, 3rd Generation Partnership Project;Technical Specification Group Radio Access Network; Evolved Universal Terrestrial Radio Access (E-UTRA); Physical channels and modulation (Release 12), 3GPP TS 36.211 V12.5.0 (Mar. 2015), 136 pages.
Huawei et al., "Further Details on Data Transmission not Starting from the Subframe Boundary", 3GPP TSG RAN WG1 Meeting #80bis, R1-151854, Belgrade, Serbia, Apr. 20-24, 2015, 3 pages.
Intel Corporation, "Extended Subframes and (e)PDCCH for LAA Downlink," 3GPP TSG RAN WG1 Meeting #80 R1-150090, Athens, Greece, Feb. 9-13, 2015, 7 pages.

\* cited by examiner

TRANSMITTER DEVICE, RECEIVER DEVICE AND METHODS THEREOF

CROSS-REFERENCE TO RELATED APPLICATIONS

This application is a continuation of International Application No. PCT/EP2015/060242, filed on May 8, 2015, the disclosure of which is hereby incorporated by reference in its entirety.

TECHNICAL FIELD

The present invention relates to a transmitter device and a receiver device. Furthermore, the present invention also relates to corresponding methods, a computer program, and a computer program product.

BACKGROUND

In one conventional solution, a Licensed Assisted Access (LAA) E-UTRAN NodeB or evolved NodeB (eNB) transmits data or control information immediately after it finishes the preamble transmission when measuring the channel as clear. A transport block is transmitted over a fractional subframe. This allows the LAA eNB to start the downlink transmission as soon as possible. This may result in mismatch between Modulation and Coding Scheme (MCS) selection and Transport Block Size (TBS) selection. Long Term Evolution (LTE) system supports adaptive MCS, which enables the transmitter to choose the proper MCS index based on Signal to Interference and Noise Ratio (SINR) condition. Basically different MCS corresponds to different SINR condition in order to reach some design target, e.g. optimized transmission efficiency or fulfilling a given Block Error Rate (BLER) target. The mapping between MfiCS index and TBS index is based on a baseline assumption, i.e., a predefined number of OFDM symbols used for Physical Downlink Shared Channel (PDSCH). It would cause significant error for mapping between TBS and MCS if the number of Orthogonal Frequency Division Multiplexing (OFDM) symbols used for the PDSCH is dramatically different with the baseline assumption.

In another conventional solution, a transport block is transmitted over a fractional subframe and the subsequent subframe. As the number of OFDM symbols used for a transport block is different with the baseline assumption, TBS scaling is applied where the actually used TBS is scaled from the indicated TBS in the DownLink (DL) grant to match the TBS and MCS. In addition, this may result in poor support of User Equipment (UE)-specific reference signal port 7 and port 8 simultaneously, or poor support of UE-specific reference signal port 9 and port 10 simultaneously, or poor support of UE-specific reference signal port 7/8/9/10 together with UE-specific reference signal port 11/12/13/14.

As specified in LTE, UE-specific reference signal port 7 and UE-specific reference signal port 8 are code multiplexed using a length-2 code, while UE-specific reference signal port 9 and UE-specific reference signal port 10 are code multiplexed using a length-2 code. In addition, UE-specific reference signal port 7/8 and UE-specific reference signal port 11/12 are multiplexed using a length-4 code, while UE-specific reference signal port 9/10 and UE-specific reference signal port 13/14 are multiplexed using a length-4 code. In case a fractional subframe contains an odd number of OFDM symbols carrying UE-specific reference signals where the preamble ends at OFDM symbol 6 and in the fractional subframe there are only 3 OFDM symbols carrying UE-specific reference signals, it would be difficult or even impossible for the receiver to distinguish the code-multiplexed reference signals which need 2 or 4 code multiplexed signals to decode, e.g., UE-specific reference port 7 with UE-specific reference port 8, and UE-specific reference port 7/8 with UE-specific reference port 11/12.

The disadvantages of these conventional solutions at least include: mismatch between MCS selection and TBS selection or additional complexity caused by TBS scaling; poor or even no support of UE-specific reference signals port 7-14, especially in the case the fractional subframe only contains an odd number of OFDM symbols carrying UE-specific reference signal.

SUMMARY

An objective of embodiments of the present invention is to provide a solution which mitigates or solves the drawbacks and problems of conventional solutions.

Another objective of embodiments of the present invention aims to address mismatch between MCS selection and TBS selection with reduced complexity.

An "or" in this description and the corresponding claims is to be understood as a mathematical OR which covers "and" and "or", and is not to be understood as an XOR (exclusive OR).

The above objectives are solved by the subject matter of the independent claims. Further advantageous implementation forms of the present invention can be found in the dependent claims.

According to a first aspect of the embodiments of the invention, the above mentioned and other objectives are achieved with a transmitter device for a wireless communication system. The transmitter device comprises a processor. The processor is configured to: map at least one first signal to a first subframe, and map at least one second signal to a second subframe having a variable time offset in relation to the first subframe. The transmitter device also includes a transceiver configured to transmit the first signal in the first subframe, transmit the second signal in the second subframe.

The concept of a subframe in this disclosure and claims should be understood in its very general term. That is, the present subframe comprises of a number of time and frequency resources and physical channels and/or signals are mapped to the mentioned time and frequency resources. The number of time and frequency resources can vary depending on the application and is therefore not limited to the definitions given in known communication systems, such as e.g., LTE, WCDMA (Wideband Code Division Multiple Access), and WiFi.

Further, it should be noted that the first subframe and the second subframe according to the present solution can be defined for the unlicensed frequency band, e.g. LAA carrier where LAA eNB shall comply with Listen-Before-Talk (LBT) principle.

By using a second subframe that has a variable time offset in relation to the first subframe a number of advantages are provided.

An advantage is that several physical channels and/or signals which are suitable for fixed transmit timing, e.g. a discovery signal, can be transmitted in the first subframe, resulting in good Radio Resource Management (RRM) measurement performance and synchronization performance. If the discovery signal is transmitted with flexible start timing, the user device (e.g. a UE) may misinterpret the subframe timing and therefore the synchronization performance is degraded. In addition, for non-serving cell UEs not aware of CCA outcome and therefore not aware of the start time of discovery signal, the RRM measurement performance may be degraded as the UEs may treat noise and interference as a discovery signal because of the change of start time of the discovery signal. In the meantime, several physical channels or signals which are suitable for flexible transmit timing, e.g. Physical Downlink Shared Channel (PDSCH), can be transmitted in the second subframe, resulting in maximum spectrum efficiency while reusing the legacy functionalities.

In a first possible implementation form of the transmit device according to first aspect, the first subframe and the second subframe have the same time duration.

An advantage of the first possible implementation form is that this further improves the re-use of the legacy functionalities as the previous subframe duration is kept for the shifted physical channels or signals.

In a second possible implementation form of the transmit device according to the first possible implementation form of the first aspect or to the first aspect as such, the start point of the second subframe is derived from a point in time when the transmitter device starts transmission of a physical channel or a signal.

Here 'derived from' can be any means to get the second subframe timing from the start of DL transmission, such as the second subframe timing is aligned with the first complete OFDM symbol boundary during the DL transmission, or aligned with the first complete OFDM symbol boundary after preamble or reservation signals or initial signal, or the Nth complete OFDM symbol boundary during the DL transmission.

An advantage of the second possible implementation form is that the transmission of useful information in the second subframe, e.g. data channels, can be performed as soon as possible, e.g. at the first OFDM symbol after CCA success, or at the first OFDM symbol after the preamble transmission, which makes best use of the channel occupancy time and therefore maximizes the spectrum efficiency.

In a third possible implementation form of the transmit device according to the first or second possible implementation forms of the first aspect or to the first aspect as such, the first signal and the second signal comprise different physical channels or signals.

In a fourth possible implementation form of the transmit device according to any of the preceding possible implementation forms of the first aspect or to the first aspect as such, the first signal comprises a discovery signal. The discovery signal may be used at the receiver side for reference signal received power measurement, or received signal strength indicator measurement, or cell identification.

An advantage is that several physical channels or signals which are suitable for fixed transmit timing, e.g. discovery signal, can be transmitted in the first subframe, resulting in good RRM measurement performance and synchronization performance. If the discovery signal is transmitted with flexible start timing, the UE may misinterpret the subframe timing and therefore the synchronization performance is degraded. In addition, for non-serving cell UEs not aware of CCA outcome and therefore not aware of the start time of discovery signal, the RRM measurement performance may be degraded as the UEs may treat noise and interference as a discovery signal because of the change of start time of the discovery signal.

In a fifth possible implementation form of the transmit device according to any of the preceding possible implementation forms of the first aspect or to the first aspect as such, the second signal comprises a data channel, or a data channel and a user device specific reference signal.

As user device specific reference signals are transmitted in a second subframe with the same duration of 1 ms, UE specific reference signals are well supported. Specifically, if the user device is a UE, the UE specific reference signal port 7 and port 8 is able to be distinguished, and also UE specific reference signal port 7/8 and UE specific reference signal port 11/12, even in the case that the fractional subframe only contains an odd number of OFDM symbols carrying UE-specific reference signal.

As UE specific reference signals are transmitted in a second subframe with the same duration of 1 ms, available number of OFDM symbols used for PDSCH is the same or similar as assumed in the baseline TBS selection, therefore TBS scaling is not needed.

In a sixth possible implementation form of the transmit device according to the fifth possible implementation form of the first aspect, the second signal further comprises a cell specific reference signal or a channel state information reference signal.

By applying the second subframe timing to cell specific reference signals and/or channel state information reference signals, the relative frequency and time allocation between cell specific reference signals and/or channel state information reference signals and user device specific reference signals are not changed. Therefore there is no collision between CSI-RS and/or CRS and UE-specific reference signals port 7-15 in LTE systems.

In a seventh possible implementation form of the transmit device according to any of the preceding possible implementation forms of the first aspect or to the first aspect as such, the variable time offset between the first subframe and the second subframe is an integer number of Orthogonal Frequency Division Multiplexing, OFDM, symbols, or from 0 to N−1 OFDM symbols, or from a subset of 0 to N−1 OFDM symbols, where N is the number of OFDM symbols in the first subframe.

By restricting the time offset between the first subframe timing and the second subframe timing to one or multiple predefined time values according to the seventh possible implementation form, the collision issue between different channels and signals, are mitigated.

In an eight possible implementation form of the transmit device according to any of the preceding possible implementation forms of the first aspect or to the first aspect as such, the second signal is not transmitted if a collision occurs between the first signal and the second signal.

By stopping transmitting the second signal associated with the second subframe in case of collision with the first signal associated with the first subframe, the functionalities provided by the first signals associated with the first subframe, e.g. RRM measurements are ensured.

In a ninth possible implementation form of the transmit device according to any of the preceding possible implementation forms of the first aspect or to the first aspect as such, the subframe number for the second subframe is derived from the subframe number for the first subframe where the first subframe and the second subframe overlap.

There are a number of advantages with the ninth possible implementation form. Firstly, the values of potential subframe number can be any value in 0 to 9, which provides the maximum randomization of generation of the pseudo-random sequence c(i), which further results in maximum interference randomization. Or otherwise if the second subframe number always starts from zero, this would mean that the possibility of the second subframe number equal to zero would be higher than the possibility of the second subframe number equal to other values. In a case that a maximum occupancy time is 4 ms, the second subframe number greater than 4 does not exist. Therefore the second subframe number starting always from 0 results in different probability for different subframe number and further results in not good interference randomization. Secondly, the UE-specific reference signals for the second subframe are complete in one subframe as the signals used for legacy LTE subframe, which helps to reuse the legacy reference signal handling.

In a tenth possible implementation form of the transmit device according to any of the preceding possible implementation forms of the first aspect or to the first aspect as such, the first subframe has a fixed start point and a fixed end point in time.

An advantage is that the first subframe with fixed start point and fixed end point in time helps to facilitate synchronization and RRM measurements based on the signals following the first subframe, otherwise the user device may misinterpret the downlink timing or consider interference and noise as the discovery signal for RRM measurement.

According to a second aspect of the embodiments of the invention, the above mentioned and other objectives are achieved with a receiver device for a wireless communication system. The receiver device comprises a receiving device configured to: receive a first signal transmitted in a first subframe, and receive a second signal transmitted in a second subframe having a variable time offset in relation to the first subframe. The receiver device also comprises a processor configured to process the received first signal, and process the received second signal.

The processing of the received first and second signals may relate to a number of different applications depending on the content of the first and the second signals. For example, the receiver device may perform RRM measurement or synchronization based on the discovery signal transmitted in a first subframe, and perform channel estimation based on UE-specific reference signals and data demodulation based on PDSCH transmitted in a second subframe. However, also other types of processing are possible.

By receiving a second subframe that has a variable time offset in relation to the first subframe a number of advantages are provided.

An advantage is that several physical channels and/or signals which are suitable for fixed transmit timing, e.g. discovery signal, can be transmitted in the first subframe, resulting in good RRM measurement performance and synchronization performance. If the discovery signal is transmitted with flexible start timing, the UE may misinterpret the subframe timing and therefore the synchronization performance is degraded. In addition, for non-serving cell UEs not aware of CCA outcome and therefore not aware of the start time of discovery signal, the RRM measurement performance may be degraded as the UEs may treat noise and interference as discovery signal because of the change of start time of discovery signal. In the meantime, several physical channels or signals which are suitable for flexible transmit timing, e.g. PDSCH, can be transmitted in the second subframe, resulting in maximum spectrum efficiency while the reusing the legacy functionalities.

In a first possible implementation form of the receiver device according to second aspect, the first signal comprises a discovery signal. The receiver device may use the discovery signal for reference signal received power measurement, or received signal strength indicator measurement, or cell identification.

According to a third aspect of the embodiments of the invention, the above mentioned and other objectives are achieved with a method for a wireless communication system. The method comprises: mapping at least one first signal to a first subframe, mapping at least one second signal to a second subframe having a variable time offset in relation to the first subframe, transmitting the first signal in the first subframe, and transmitting the second signal in the second subframe.

In a first possible implementation form of the method according to third aspect, the first subframe and the second subframe have the same time duration.

In a second possible implementation form of the method according to the first possible implementation form of the third aspect or to the third aspect as such, the start point of the second subframe is derived from a point in time when the transmitter device starts transmission of a physical channel or a signal.

In a third possible implementation form of the method according to the first or second possible implementation forms of the third aspect or to the third aspect as such, the first signal and the second signal comprise different physical channels or signals.

In a fourth possible implementation form of the method according to any of the preceding possible implementation forms of the third aspect or to the third aspect as such, the first signal comprises a discovery signal.

In a fifth possible implementation form of the method according to any of the preceding possible implementation forms of the third aspect or to the third aspect as such, the second signal comprises a data channel, or a data channel and a user device specific reference signal.

In a sixth possible implementation form of the method according to the fifth possible implementation form of the third aspect, the second signal further comprises a cell specific reference signal or a channel state information reference signal.

In a seventh possible implementation form of the method according to any of the preceding possible implementation forms of the third aspect or to the third aspect as such, the variable time offset between the first subframe and the second subframe is an integer number of Orthogonal Frequency Division Multiplexing, OFDM, symbols, or from 0 to N−1 OFDM symbols, or from a subset of 0 to N−1 OFDM symbols, where N is the number of OFDM symbols in the first subframe.

In an eight possible implementation form of the method according to any of the preceding possible implementation forms of the third aspect or to the third aspect as such, the method further comprises not transmitting the second signal if a collision occurs between the first signal and the second signal.

In a ninth possible implementation form of the method according to any of the preceding possible implementation forms of the third aspect or to the third aspect as such, the method further comprises deriving the subframe number for the second subframe from the subframe number for the first subframe where the first subframe and the second subframe overlap.

In a tenth possible implementation form of the method according to any of the preceding possible implementation forms of the third aspect or to the third aspect as such, the first subframe has a fixed start point and a fixed end point in time.

According to a fourth aspect of the embodiments of the invention, the above mentioned and other objectives are achieved with a method for a wireless communication system. The method comprises: receiving a first signal transmitted in a first subframe, receiving a second signal transmitted in a second subframe having a variable time offset in relation to the first subframe, processing the received first signal, and processing the received second signal.

In a first possible implementation form of the method according to fourth aspect, the first signal comprises a discovery signal. The discovery signal may be used in the method for reference signal received power measurement, or received signal strength indicator measurement, or cell identification.

The advantages of the methods according to the third aspect or the fourth aspect are the same as those for the corresponding device claims according to the first and second aspects.

The embodiments of the present invention also relate to a computer program, characterized in code means, which when run by processing means causes said processing means to execute any method according to the embodiments of the present invention. Further, the embodiments of the present invention also relate to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION OF ILLUSTRATIVE EMBODIMENTS

It is to be noted that in many of the examples and embodiments in this disclosure 3rd Generation Partnership Project (3GPP) LTE terminology is used. However, it is realised by the skilled person that embodiments of the present invention are not limited to such LTE systems only. Obviously, embodiments of the present invention may be applied in any wireless communication system using subframe timing or corresponding timing concepts for transmission. Further to be noted is that embodiments of the present invention may be applied in cellular system having UpLink (UL) and DownLink (DL) transmissions but also in wireless communication system without the concepts of UL and DL.

Figure 1:
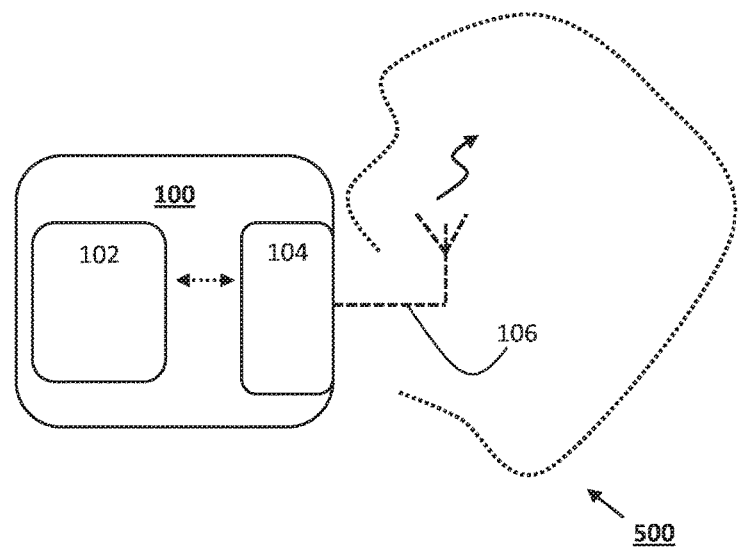
FIG. 1 shows a transmitter device according to an embodiment of the present invention.

FIG. 1 shows a transmitter device 100 according to an embodiment of the present invention. The transmitter device 100 has the capabilities to communicate in a wireless communication system 500 as illustrated in FIG. 1. The transmitter device 100 includes one or more antennas 106 which are coupled to a transceiver 104 of the transmitter device 100. The transmitter device 100 further comprises a processor 102 communicably coupled with the transceiver 104 by means of communication means known in the art.

The processor 102 of the transmitter device 100 is configured to map at least one first signal to a first subframe SF1 and further configured to map at least one second signal to a second subframe SF2. The relation between the first subframe SF1 and the second subframe SF2 is such that the second subframe SF2 has a variable time offset in relation to the first subframe SF1. The mapped first and second signals are forwarded to the transceiver 104 for transmission in the wireless communication system 500. The transceiver 104 of the transmitter device 100 is hence configured to transmit the first signal in the first subframe SF1 and to transmit the second signal in the second subframe SF2.

Figure 2:
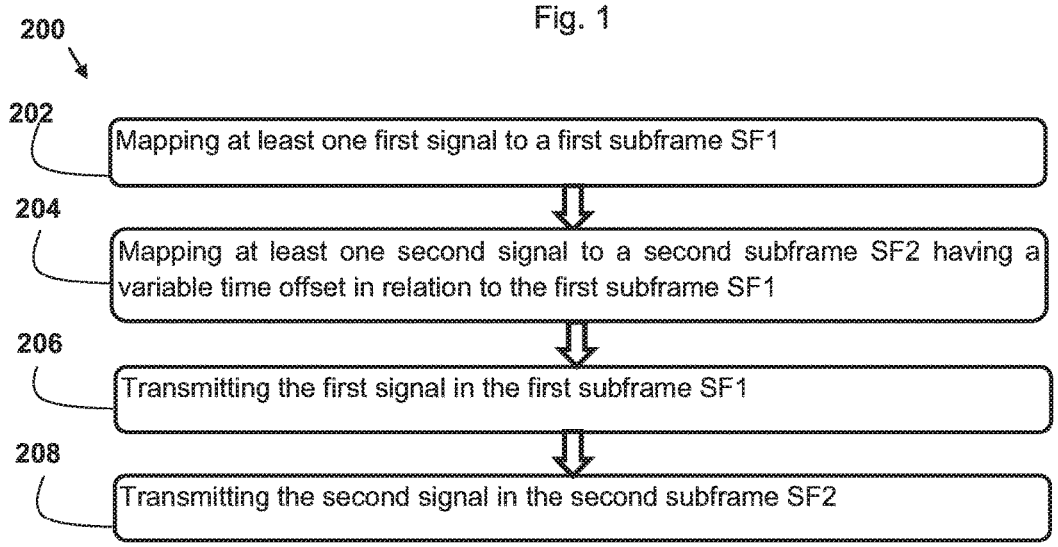
FIG. 2 shows a method according to an embodiment of the present invention.

FIG. 2 shows a corresponding method 200 according to an embodiment of the present invention. The method 200 may be executed in a transmitter device 100 such as the one illustrated in FIG. 1. The method 200 comprises the step of mapping 202 at least one first signal to a first subframe SF1. The method 200 further comprises the step of mapping 204 at least one second signal to a second subframe SF2 having a variable time offset in relation to the first subframe SF1. The method 200 further comprises the step of transmitting 206 the first signal in the first subframe SF1. The method 200 finally comprises the step of transmitting 208 the second signal in the second subframe SF2.

Figure 3:
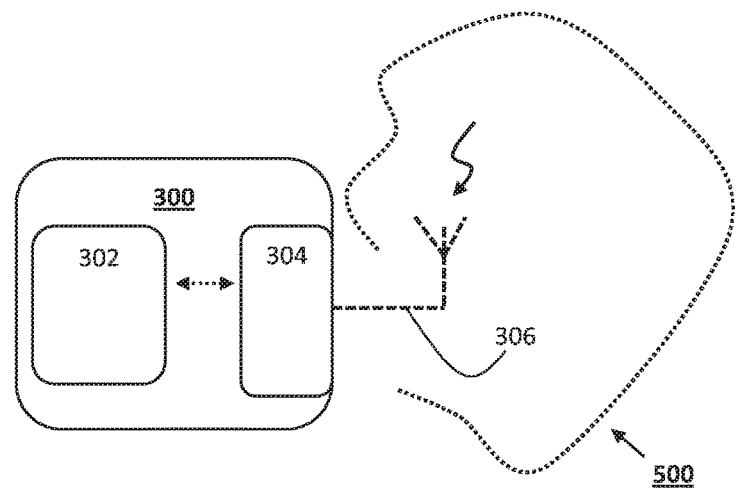
FIG. 3 shows a receiver device according to an embodiment of the present invention.

FIG. 3 shows a receiver device 300 according to an embodiment of the present invention. The receiver device 300 comprises a processor 302 and a transceiver 304. The processor 302 is communicably coupled with the transceiver 304 by means of communication means known in the art. In the embodiment shown in FIG. 3 the receiver device 300 further comprises one or more antennas 306 coupled to the transceiver 304 for transmission in the wireless communication system 500.

The processor 302 of the user device 300 is configured to receive a first signal transmitted in a first subframe SF1 and further configured to receive a second signal transmitted in a second subframe SF2. As described above for the transmitter device 100, the second subframe SF2 has a variable time offset in relation to the first subframe SF1. Further, the processor 302 of the receiver device 300 is configured to process the received first signal and further configured to process the received second signal.

Figure 4:
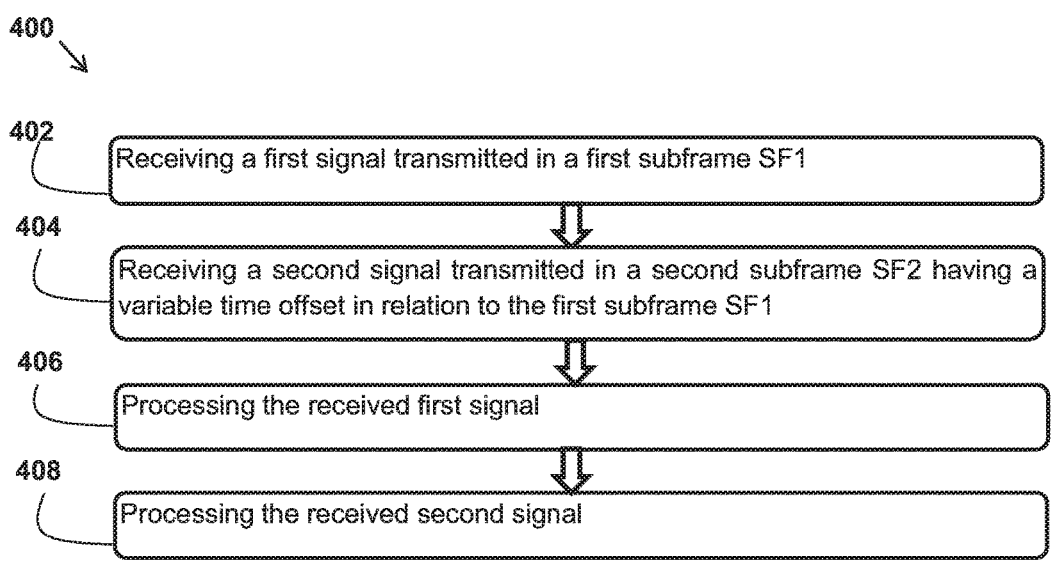
FIG. 4 shows another method according to an embodiment of the present invention.

FIG. 4 shows a corresponding method 400 according to an embodiment of the present invention. The method 400 may be executed in a receiver device 300 such as the one illustrated in FIG. 3. The method 400 comprises the step of receiving 402 a first signal transmitted in a first subframe SF1. The method 400 further comprises the step of receiving 404 a second signal transmitted in a second subframe SF2 having a variable time offset in relation to the first subframe SF1. The method 400 further comprises the step of processing 406 the received first signal. The method 400 finally comprises the step of processing 408 the received second signal.

Figure 5:
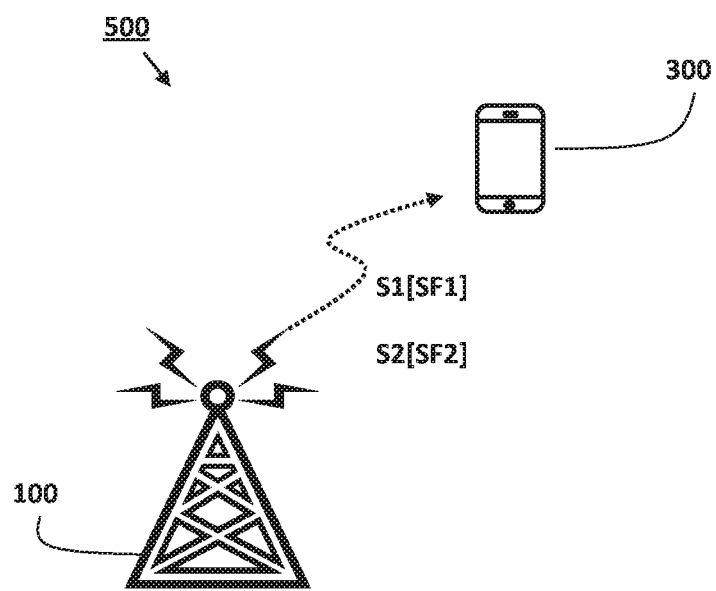
FIG. 5 shows a wireless communication system according to an embodiment of the present invention.

FIG. 5 shows a wireless communication system 500 according to an embodiment of the present invention. The wireless communication system 500 comprises at least one transmitter device 100 and at least one receiver device 300 as described above and may be denoted a System C wireless communication system 500. It is illustrated how the transmitter device 100 transmits the first signal S1 in a first subframe SF1 and the second signal S2 in a second subframe SF2. In the example in FIG. 5 the transmitter device 100 is a radio network node and the receiver device 300 is a user device, e.g. a UE.

Generally, embodiments of the present invention disclose to support two subframe timings, or in other words two different types of subframes, for transmission of channels and signals, i.e., the first subframe SF1 and the second subframe SF2.

The first subframe SF1 may be fixed and may be applied for several physical layer channels or signals according to embodiments of the present invention. The second subframe SF2 has a variable time offset in relation to the first subframe SF1 and is therefore flexible and may be derived from the start of e.g., a (DL) transmitter device 100 transmission. This may e.g., be performed once the transmitter device 100 measures the channel as clear and applied for several other physical layer channels or signals.

In this disclosure fixed means that the start time point and the end time point of the first subframe SF1 are fixed or pre-defined, e.g., a LTE subframe with pre-defined start point in time and end point in time. Moreover, the second subframe SF2 timing may hence be seen as flexible meaning that the start time point and/or the end time point of the second subframe SF2 is not fixed, e.g., the start time point of the second subframe SF2 may be subject to a CCA outcome or any other system mechanisms.

Embodiments of the present invention therefore provide a wireless communication system 500, denoted herein System C. The System C may reuse the functionalities of System A and also able to co-exist with System B which follows the Listen-Before-Talk (LBT) principle.

System A is characterized by downlink transmission based on a fixed subframe timing which assumes fixed start time and fixed duration. System A can be a LTE system, a WCDMA system, or any other system based on fixed subframe timing. System B is characterized by the transmitting node can only start transmitting after it has performed the CCA and measured that the channel is idle. System B can be a WiFi system, or any other system which follows the LBT principle. The 3GPP started a release 13 LTE study item, Licensed Assisted Access (LAA) with at least one licensed carrier as the primary cell (PCell) and at least one unlicensed carrier as the secondary cell (SCell), aiming to reuse LTE functionalities and also follows LBT principle in order to co-exist with WiFi system. System C can be LAA system or any other system which is based on a combination of fixed subframe system and a system following LBT.

One example of System A with fixed subframe timing is LTE frequency division duplex (FDD). As specified in 3GPP TS 36.211, one radio frame consists of 10 subframes, and one subframe is 1 ms and consists of 2 slots. The same holds also for LTE time division duplex (TDD). For downlink transmission, the eNodeB always transmits downlink physical channels and signals on a subframe basis, where for each subframe, the starting time point and the ending time point are fixed and the duration is always 1 ms.

System C is expected to operate based on fixed subframe timing. System C may not always transmit the downlink as it has to perform CCA. Once a transmitting node of System C measures the channel as clear, after a potential transmission of reservation signals or preamble or initial signals at least to reserve the channel, the transmitting node may start data/control transmission. Given that the transmitting node may measure the channel as clear at a random time, the downlink transmission may not transmit at the subframe boundary, i.e. downlink transmission over a fractional subframe.

In one embodiment of the present invention, the second subframe SF2 may be derived from a point in time when the transmitter device 100 starts transmission of a physical channel or signal. This includes any means to get the second subframe SF2 timing from the start of the transmitter device 100 transmission, such as the second subframe SF2 timing is aligned with the first complete OFDM symbol boundary during the transmission, or aligned with the first complete OFDM symbol boundary after preamble or reservation signals or initial signal, or the Nth complete OFDM symbol boundary during the transmission.

Figure 6:
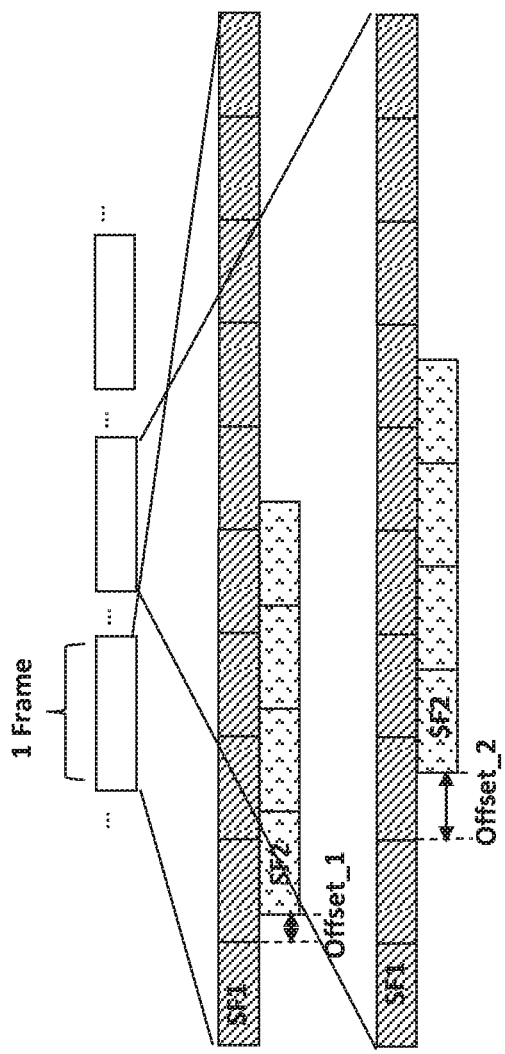
FIG. 6 illustrates the transmission of two different types of subframes according to embodiments of the present invention, i.e. a first subframe SF1 type and a second subframe SF2 type.

As the start of a second subframe SF2 may be subject to LBT outcome and can be flexible in time, there is a variable time offset between the first subframe SF1 and the second subframe SF2, as illustrated in FIG. 6. In this example every time the LAA eNB starts downlink transmission, the start time of a second subframe SF is subject to LBT outcome and may be different in relation to a first subframe SF1 with a time offset. The time offset may vary and have two different offset values Offset_1 and Offset_2 (in the example in FIG. 6) when LAA eNB starts downlink transmission. Note that in the example in FIG. 6 the time offset refers to the smallest time difference between a first subframe SF1 and a second subframe SF2 and shall be no larger than the duration of one subframe.

The time offset may vary each time when the LAA eNB starts downlink transmission using a second subframe SF2 depending on when the LAA eNB measures the channel as clear. In one example the time offset is an integer number from 0 to N−1 in terms of OFDM symbols, where N is the number of OFDM symbols in a subframe or from a subset of 0 to N−1 OFDM symbols, where N is the number of OFDM symbols in the first subframe SF1.

In one embodiment of the present invention, the time offset between the first subframe SF1 and the second subframe SF2 is restricted to one or multiple predefined values, where the time offset refers to the smallest time offset between a subframe following the first subframe SF1 and a subframe following the second subframe SF2.

This can be used for collision avoidance between different channels or signals. One example is that the time offset is only selected from {3, 4, 10, 11} OFDM symbols. In this case if Cell Specific Reference Signal (CRS) is transmitted following the first subframe SF1 timing, and the UE-specific reference signals are transmitted following the second subframe SF2 timing, there is no collision between CRS and UE-specific reference signals. For example, if the time offset is 3 OFDM symbols, the CRS are transmitted in OFDM symbol #0, #4 in a slot, while the UE-specific reference signals are transmitted in OFDM symbol #1, #2 in a slot.

In one embodiment of the present invention, the first subframe SF1 timing is fixed and of fixed duration, which could be aligned with the Primary Cell (PCell) subframe timing if the System C is a LAA carrier as Secondary Cell (SCell) aggregated with a licensed carrier as PCell. The first subframe SF1 timing is used to transmit information suitable with fixed subframe timing, e.g., periodic or opportunistic periodic information for radio resource management measurements, or cross carrier scheduling using a DL grant from the PCell to schedule a transmission on the SCell.

The advantage of transmitting the periodic or opportunistic periodic information of the discovery signal based on the first subframe SF1 timing is that the receiving device 300, including the serving cell UE, the non-serving cell UE and the non-serving cell eNB are able to receive downlink information in a pre-defined periodic manner. This reduces the implementation complexity without the need of always measuring the downlink channels or signals. This is especially helpful to a receiving device 300 not aware of CCA outcome as the timing is always fixed.

The channels or signals transmitted applying the first subframe timing comprise at least Discovery Signal (DRS) according to an embodiment. The DRS should be used for reference signal received power measurement, or received signal strength indicator measurement, or cell identification, or a combination thereof at the receiver side.

Furthermore, the first subframe SF1 timing can also apply for Cell Specific Reference Signal (CRS), Physical Broadcast Channel (PBCH), Primary Synchronization Signal (PSS) and Secondary Synchronization Signal (SSS). This provides the advantage that the UEs are aware of the exact time location of the CRS, PBCH, PSS and SSS, further reducing the UE detection complexity.

The second subframe SF2 timing is, according to an embodiment of the present invention, flexible and related to the preamble or reservation signal transmission. That is, immediately after the eNB measures the channel as clear and transmits the preamble or the reservation signals, which is applied for some other channels and/or signals, e.g., at least PDSCH and associated UE specific reference signals.

Figure 7:
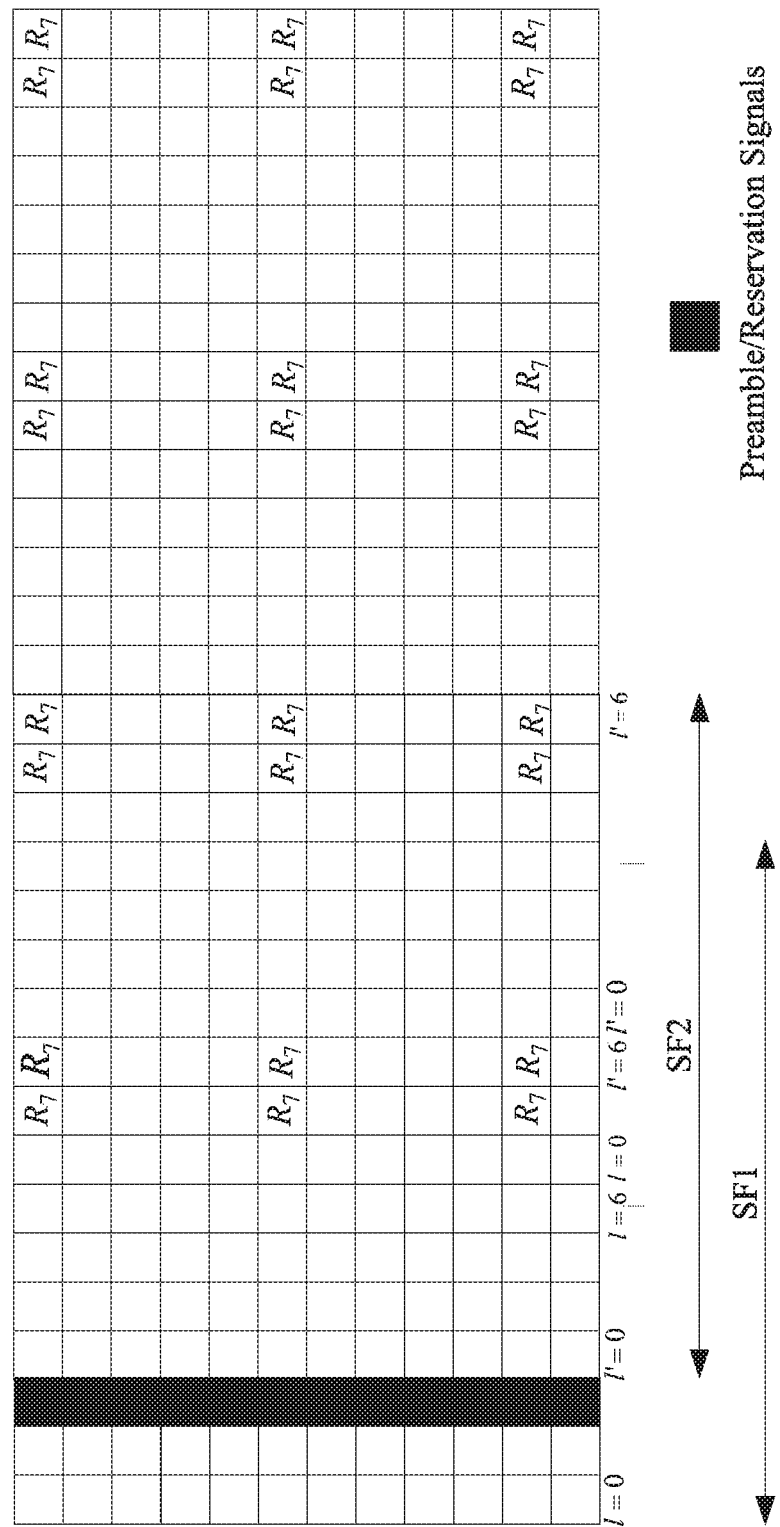
FIG. 7 shows a UE specific reference antenna port for normal CP.

The transmitting device 100, e.g. LAA eNB, will start transmission of downlink data and/or control information immediately after the transmission of preamble or reservation signals. For demodulation purpose, UE-specific reference signals will be transmitted if UE-specific reference signal related transmission mode is scheduled, e.g. Transmission Mode 8, Transmission Mode 9 and Transmission Mode 10 as defined in 3GPP TS36.213. The PDSCH will be transmitted from the first OFDM symbol or after a control region in 1 ms period in a second subframe SF2 which is immediately after the preamble or reservation signals. During this second subframe SF2, the UE-specific reference signal is transmitted using the same frequency and time resources as specified in the first subframe SF1, which is illustrated in FIG. 7, where l denotes OFDM symbol index in the first subframe SF1, l' denotes OFDM symbol index in the second subframe SF2. A second subframe SF2 is time shifted, in FIG. 7, by 3 OFDM symbols in relation to a first subframe SF1, and after preamble/reservation signal which occupies one OFDM symbol. Further, UE-specific reference signals on antenna port 7 are transmitted in the last two OFDM symbols in each of the two slots of a second subframe SF2, which is exactly the same as in the first subframe SF1. The notation "$R_7$" in FIG. 7 is used to denote a resource element used for reference signal transmission on antenna port 7.

There are several advantages by introducing the present second subframe SF2 timing in the LTE system. Firstly, as the UE-specific reference signals are transmitted on a 1 ms basis, there are still four OFDM symbols carrying UE-specific reference signals for UE-specific reference signal port 7-14, resulting in support a length-4 multiplexing code and therefore good support of UE-specific reference signals. Secondly, as the PDSCH is transmitted on a 1 ms basis, the legacy TBS selection mechanism can be kept resulting in reduced complexity without the changes of TBS selection and rate matching. Thirdly, as the second subframe SF2 has a flexible starting time immediately after the preamble or reservation signals and fits into the first available OFDM symbol for downlink control and data transmission, it provides the benefit that no OFDM symbol will be waived and therefore it is resource efficient. Fourthly, as the PDSCH is transmitted on a 1 ms basis always, the overall time and frequency recourse available for the retransmission is similar as the initial transmission which facilitates the Hybrid Automatic Repeat Request (HARQ) retransmission in a way that a comparable amount of time and frequency resource can be used for the retransmission. If the 1 ms subframe is not kept for the first transmission, one example is that an initial transmission occupies the entire bandwidth and a duration of 1.5 ms, the transmitting device 100 may not be able to schedule a retransmission because the retransmission duration is 1 ms and not able to support equal TBS as the initial transmission.

One other example is that the second subframe SF2 includes a fixed number of OFDM symbols. This may be used for some special subframe or new subframe design, e.g. TDD special subframe.

For UE-specific reference signal, the reference-signal sequence r(m) is derived from the pseudo-random sequence c(i) which is initialised with the subframe number at the start of each subframe. If UE-specific reference signals are generated in the same way as specified in 3GPP TS 36.211 v12.4.0, there is a possibility that the subframe numbers used for UE-specific reference signals within a second subframe SF2 are different because the second subframe SF2 may span over two different legacy subframes. This would result that the reference signals used for the second subframe SF2 are different with those for the legacy subframe, further resulting in increased complexity.

Therefore, in one embodiment of the present invention, the UE reference signals within the second subframe SF2 can be generated in the same way as specified in 3GPP TS25.211, with the modification that the subframe number shall be changed in a way that all the UE reference signals in the second subframe SF2 shall use the same subframe number, and the subframe number for the second subframe SF2 concerning the LAA carrier shall be derived from the associated subframe number of the first subframe SF1 concerning the LAA carrier which is subframe aligned with the PCell, where LAA carrier always serves as a SCell. The pseudo-random sequence c(i) is derived from the second subframe SF2 number. The second subframe SF2 number is derived from the subframe number of the first subframe SF1, where the first subframe SF1 and the second subframe SF2 at least partly overlaps.

This provides several advantages. Firstly, the values of potential subframe number can be any value in 0 to 9, which provides the maximum randomization of generation of the pseudo-random sequence c(i), which further results in maximum interference randomization. Or otherwise if the second subframe SF2 number always starts from zero, this would mean the possibility of the second subframe SF2 number equal to zero would be higher than the possibility of the second subframe SF2 number equal to other values. In a case that a maximum occupancy time is 4 ms, the second subframe SF2 number greater than 4 does not exist. Therefore the second subframe SF2 number starting always from 0 results in different probability for different subframe number and further results in not good interference randomization. Secondly, the UE-specific reference signals for the second subframe SF2 are complete in one subframe as the signals used for legacy LTE subframe, which helps to reuse the legacy reference signal handling.

Figure 8:
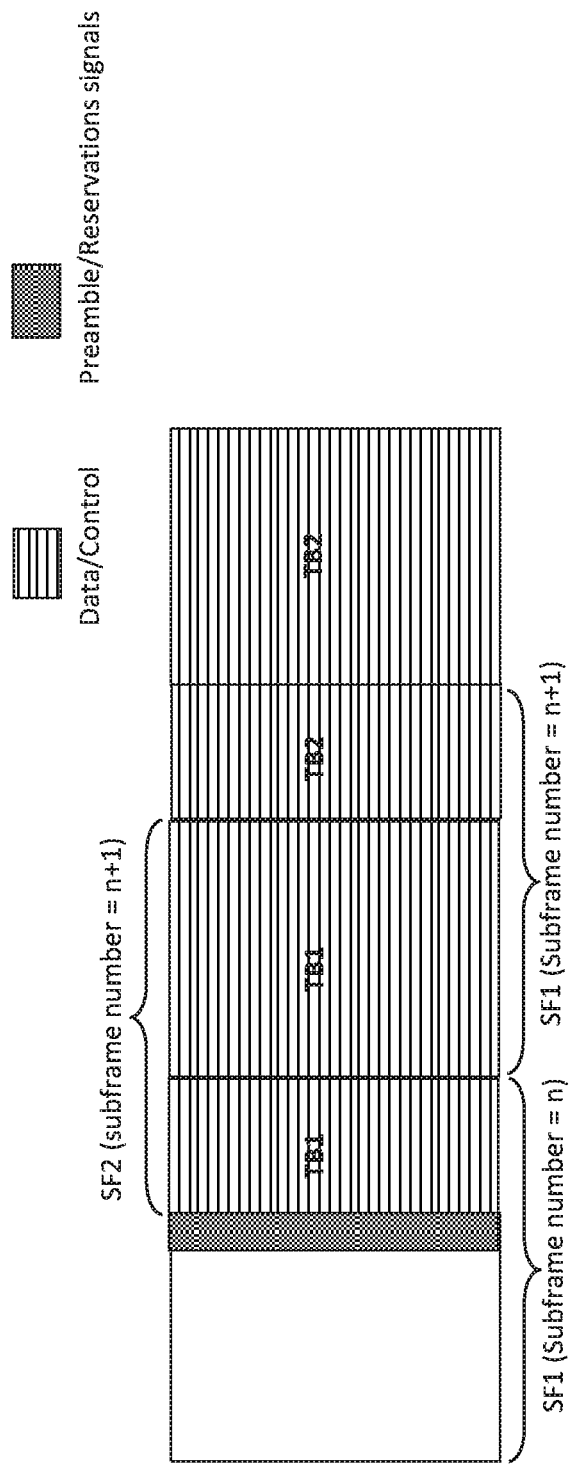
FIG. 8 shows an example how the number for the second subframe is derived from the first subframe.

One example of this embodiment is that the second subframe SF2 number is always equal to the subframe number of the associated SF1 subframe which contains the last OFDM symbol of the second subframe SF2 as illustrated in FIG. 8. The subframe number of a second subframe SF2, in FIG. 8, is set to n+1 in case of overlapping with two consecutive subframes belonging to a first subframe SF1 type with subframe number n and n+1, respectively.

Another example is that the subframe number of the second subframe SF2 is always equal to the subframe number of the associated first subframe SF1 which contains the first OFDM symbol of the second subframe SF2.

As specified in 3GPP TS 36.211 v12.4.0, for PDSCH the scrambling sequence generator shall be initialised at the start of each subframe, where a initialisation value $c_{init}$ for generating a scrambling sequence is derived from the subframe number.

According to another embodiment of the present invention, the scrambling sequence generator for PDSCH shall be initialised in the same way as specified in 3GPP TS25.211, with the modification that the subframe number of the second subframe SF2 shall be derived from the subframe number of the first subframe SF1 concerning the LAA carrier which is subframe aligned with the PCell, where LAA carrier always serves as a SCell. The initialisation value $c_{init}$ for generating a scrambling sequence is derived from the second subframe SF2 number. The second subframe SF2 number is derived from the subframe number of the first subframe SF1, where the first subframe SF1 and the second subframe SF2 at least partly overlaps. This also provides the advantage of interference randomization.

In one embodiment of the present invention, the second subframe SF2 is also applied for CSI-RS. This provides the advantage that there is no collision between CSI-RS and UE-specific reference signals port 7-15, as the relative frequency/time pattern of CSI-RS and UE-specific RS is not changed while currently CSI-RS design avoids collision with UE-reference signals port 7-15.

If the first subframe SF1 is applied for CSI-RS and the second subframe SF2 is applied for UE-specific reference signals port 7-15, there is collision as the CSI-RS and DMRS is not completely separated in the frequency domain. Taking normal CP and FDD as example, CSI-RS may exist at all possible frequency positions in the 3rd and 4th OFDM symbol in the 2nd slot. If the shifting of UE-specific reference signals results in an OFDM symbol containing UE-specific reference signals also contains CSI-RS, collision may occur.

In one embodiment of the present invention, the second subframe SF2 is also applied for CRS. This also provides the advantage that there is no collision between CRS and UE-specific reference signals port 7-15. A further advantage is that transmission scheme based on CRS can also be easily supported as there is a complete set of CRS transmitted in a subframe associated with the second subframe SF2 timing.

In one further embodiment of the present invention, the second subframe SF2 is applied both for CSI-RS, CRS and UE-reference signals port 7-15. This also provides the advantage that there is no collision among CSI-RS, CRS and UE-reference signals port 7-15.

In yet one further embodiment of the present invention, the signals and/or channels associated with the first subframe SF2, e.g., DRS, are prioritized when colliding with the signals and/or channels associated with the second subframe SF2, e.g., PDSCH, CSI-RS, CRS, and UE-reference signals. A collision can be simultaneous transmission over a Resource Element (RE), an OFDM symbol or a subframe. One way is to drop or not transmit the signals and/or channels associated with the second subframe SF2 in case of collision. The other way is to shift the signals and/or channels associated with the second subframe SF2 in the time and/or frequency domain in case of collision. This provides the advantage that RRM related functionalities are ensured.

In one example, the CRS is transmitted following both the first subframe SF1 timing and the second subframe SF2 timing. CRS transmitted following the first subframe SF1 timing would be used at least for RRM measurements, e.g. as part of DRS, while CRS transmitted following the second subframe SF2 timing would be used at least for demodulation. In case of collision between the two types of CRS, the CRS following the second subframe SF2 timing is dropped.

The present transmitter device 100 and receiver device 300 may correspond to a radio network node and a user device, respectively.

A radio network node, or base station, e.g. a Radio Base Station (RBS), which in some networks may be referred to as transmitter, "eNB", "eNodeB", "NodeB" or "B node", depending on the technology and terminology used. The radio network nodes may be of different classes such as e.g. macro eNodeB, home eNodeB or pico base station, based on transmission power and thereby also cell size. The radio network node can be a Station (STA), which is any device that contains an IEEE 802.11-conformant Media Access Control (MAC) and Physical Layer (PHY) interface to the Wireless Medium (WM).

A user device, UE, mobile station, wireless terminal and/or mobile terminal is enabled to communicate wirelessly in a wireless communication system, sometimes also referred to as a cellular radio system. The User Equipment (UE) may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM).

Furthermore, any method according to the present invention may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present first network node and second network node comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims.

What is claimed is:

1. A transmitter device, comprising:
   a processor;
   a non-transitory computer-readable storage medium storing a program to be executed by the processor, the program including instructions for:
   mapping a first signal to a first subframe; and
   mapping a second signal to a second subframe, the second subframe having a variable time offset in relation to the first subframe, wherein the variable time offset is less than or equal to a time duration of a subframe, and wherein a start of the second subframe is determined according to a Clear Channel Assessment (CCA) outcome; and
   a transceiver, configured to:
   transmit the first signal in the first subframe; and
   transmit the second signal in the second subframe.

2. The transmitter device according to claim 1, wherein the first subframe and the second subframe have a same time duration.

3. The transmitter device according to claim 1, wherein a start point of the second subframe is derived from a point in time in which the transmitter device starts transmission of a physical channel or a signal.

4. The transmitter device according to claim 1, wherein the first signal and the second signal comprise different physical channels or signals.

5. The transmitter device according to claim 1, wherein the first signal comprises a discovery signal.

6. The transmitter device according to claim 1, wherein the second signal comprises a data channel, or the data channel and a user device specific reference signal.

7. The transmitter device according to claim 6, wherein the second signal further comprises a cell specific reference signal or a channel state information reference signal.

8. The transmitter device according to claim 1, wherein the variable time offset between the first subframe and the second subframe is an integer number of Orthogonal Frequency Division Multiplexing (OFDM) symbols, or from 0 to N−1 OFDM symbols, or from a subset of 0 to N−1 OFDM symbols, wherein N is the number of OFDM symbols in the first subframe.

9. The transmitter device according to claim 1, wherein the second signal is not transmitted when a collision occurs between the first signal and the second signal.

10. The transmitter device according to claim 1, wherein a second subframe number for the second subframe is derived from a first subframe number for the first subframe, wherein the first subframe and the second subframe overlap.

11. The transmitter device according to claim 1, wherein the first subframe has a fixed start point and a fixed end point in time.

12. A receiver device, comprising:
    a receiver, configured to:
    receive a first signal transmitted in a first subframe; and
    receive a second signal transmitted in a second subframe, the second subframe having a variable time offset in relation to the first subframe, wherein the variable time offset is less than or equal to a time duration of a subframe, and wherein a start of the second subframe has been determined according to a Clear Channel Assessment (CCA) outcome;
    a processor; and
    a computer-readable storage medium storing a program to be executed by the processor, the program including instructions for:
    processing the received first signal; and
    processing the received second signal.

13. A method, comprising:
    mapping a first signal to a first subframe;
    mapping a second signal to a second subframe, the second subframe having a variable time offset in relation to the first subframe, wherein the variable time offset is less than or equal to a time duration of a subframe, and wherein a start of the second subframe is determined according to a Clear Channel Assessment (CCA) outcome;
    transmitting the first signal in the first subframe; and
    transmitting the second signal in the second subframe.

14. The method according to claim 13, wherein the first subframe and the second subframe have a same time duration.

15. The method according to claim 13, wherein the method is performed by a transmitter device, and a start point of the second subframe is derived from a point in time in which the transmitter device starts transmission of a physical channel or a signal.

16. The method according to claim 13, wherein the first signal and the second signal comprise different physical channels or signals.

17. The method according to claim 13, wherein the first signal comprises a discovery signal.

18. A non-transitory computer-readable medium storing computer executable instructions that, when executed by one or more processors, cause the one or more processors to perform the method of claim 13.

19. A method, comprising:
    receiving a first signal transmitted in a first subframe;
    receiving a second signal transmitted in a second subframe, the second subframe having a variable time offset in relation to the first subframe, wherein the variable time offset is less than or equal to a time duration of a subframe, and wherein a start of the second subframe has been determined according to a Clear Channel Assessment (CCA) outcome;
    processing the received first signal; and
    processing the received second signal.

20. A non-transitory computer-readable medium storing computer executable instructions that, when executed by one or more processors, cause the one or more processors to perform the method of claim 19.

* * * * *